(12) United States Patent
Sebire et al.

(10) Patent No.: US 8,059,682 B2
(45) Date of Patent: Nov. 15, 2011

(54) APPARATUS, METHOD AND COMPUTER PROGRAM PRODUCT TO REQUEST A DATA RATE INCREASE BASED ON ABILITY TO TRANSMIT AT LEAST ONE MORE SELECTED DATA UNIT

(75) Inventors: Benoist Sebire, Tokyo (JP); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 1245 days.

(21) Appl. No.: 11/540,315

(22) Filed: Sep. 28, 2006

(65) Prior Publication Data
US 2007/0073895 A1 Mar. 29, 2007

Related U.S. Application Data

(60) Provisional application No. 60/721,618, filed on Sep. 29, 2005.

(51) Int. Cl.
*H04J 3/16* (2006.01)
(52) U.S. Cl. .................... 370/470; 370/543
(58) Field of Classification Search .......... 709/230; 370/470, 543
See application file for complete search history.

(56) References Cited

U.S. PATENT DOCUMENTS

| | | | |
|---|---|---|---|
| 7,363,010 B2* | 4/2008 | Oh et al. | 455/67.11 |
| 2003/0185193 A1* | 10/2003 | Choi et al. | 370/348 |
| 2005/0266846 A1* | 12/2005 | Kim | 455/436 |
| 2006/0143444 A1* | 6/2006 | Malkamaki et al. | 713/160 |
| 2006/0268821 A1* | 11/2006 | Terry | 370/349 |
| 2007/0036104 A1* | 2/2007 | Bachl et al. | 370/329 |

FOREIGN PATENT DOCUMENTS

| | | |
|---|---|---|
| GB | 2401760 A | 11/2004 |
| WO | WO-2004/075593 A2 | 9/2004 |
| WO | WO-2006/102949 A1 | 10/2006 |
| WO | WO-2006/113829 A2 | 10/2006 |

OTHER PUBLICATIONS

3GPP TSG-RAN WG2 Meeting #48bis; R2-052358, "Criteria for the Happy Bit", Cannes, France, Oct. 10-14, 2005; http://www.3gpp.org/ftp/tsg_ran/WG2_RL2/TSGR2_48bisfDocuments/.

"Universal Mobile Telecommunications System (UMTS); FDD enhanced uplink; Overall description; Stage 2", (3GPP TS 25.309 version 6.6.0 Release 6, (2006) pp. 1-34.

"E-TFC Selection", Section 11.8.1.4, 3GPP TS 25.321, Release 6, Version 6.5.0, Jun. 2005, pp. 71-72.

(Continued)

*Primary Examiner* — Kevin C Harper
*Assistant Examiner* — Sai-Ming Chan
(74) *Attorney, Agent, or Firm* — Harrington & Smith

(57) ABSTRACT

A method includes, in response to selection of a transport block to be transmitted through a wireless channel at a current data rate, performing at least the following: selecting a size for a data unit that can be scheduled for transmission; identifying one of a number of potential transport blocks, the identified potential transport block having a corresponding transport block size large enough to hold at least the selected size of the data unit and the transport block size of the currently selected transport block; determining whether the identified potential transport block is available for transmission; and transmitting a request for an increase in the current data rate in response to the identified potential transport block being available for transmission.

47 Claims, 7 Drawing Sheets

OTHER PUBLICATIONS

"Happy Bit Setting", Section 11.8.1.5, 3GPP TS 25.321, Release 6, Version 6.5.0, (Jun. 2005), pp. 72-73.
"MAC-e/es entity-UE Side", Figure 4.2.3.4.1 of section 4.2.3.4, 3GPP TS 25.321, Release 6, Version 6.5.0, (Jun. 2005), pp. 10-16.
"Transport Format, Transport Format Combination (Set) TS 25.302", pp. 1-5.
R2-050179, 3GPP TSG-RAN WG2 Meeting #45bis, Sophia Antipolis, France, Jan. 10-14, 2005 "Rate-Request Proposal".
R2-042667, 3GPP TSG-RAN WG2 Meeting #45, Yokohama, Japan, Nov. 15-19, 2004, "Rate-Request Discussion Report".

\* cited by examiner

APPARATUS, METHOD AND COMPUTER PROGRAM PRODUCT TO REQUEST A DATA RATE INCREASE BASED ON ABILITY TO TRANSMIT AT LEAST ONE MORE SELECTED DATA UNIT

CROSS-REFERENCE TO RELATED APPLICATIONS

The present application claims the benefit under 35 U.S.C. §119(e) of U.S. Provisional Patent Application No. 60/721,618, filed on 29 Sep. 2005, the disclosure of which is hereby incorporated by reference in its entirety.

TECHNICAL FIELD

The exemplary and non-limiting embodiments of this invention relate generally to wireless communication systems, apparatus and methods and, more specifically, relate to wireless communication system techniques for enabling apparatus such as user equipment to request an increase in a data rate.

BACKGROUND

The following abbreviations are defined as follows:
DCH Dedicated Channel
DPDCH Dedicated Physical Data Channel
DPCCH Dedicated Physical Control Channel
E-DCH Enhanced Uplink DCH
E-DPDCH Enhanced DPDCH
E-DPCCH Enhanced DPCCH
E-TFC E-DCH Transport Format Combination
HSUPA High Speed Uplink Packet Access
IE Information Element
MAC Medium Access Control
Node B base station
PDU Protocol Data Unit
RLC Radio Link Control
RNC Radio Network Controller
RRC Radio Resource Control
SDU Service Data Unit
SG Serving Grant
TTI Transmission Timing Interval
UE User Equipment, e.g., a mobile terminal Of interest herein is the uplink DCH (EDCH) for packet data traffic in, for example, Release 6 of 3GPP TS 25.309, 3rd Generation Partnership Project; Technical Specification Group Radio Access Network; FDD Enhanced Uplink; Overall Description; Stage 2 (Release 6).

In HSUPA, certain attempts at enhancements are currently approached by distributing some of the packet scheduler functionality to the Node Bs to provide faster scheduling of bursty, non-real-time traffic than can be provided by the Layer 3 (L3, Network Layer) of the RNC. The idea is that with faster link adaptation it is possible to more efficiently share the uplink power resource between packet data users, as when packets have been transmitted from one user the scheduled resource can be made available immediately to another user. This technique attempts to avoid the peaked variability of noise rise, such as when high data rates are being allocated to users that are running bursty, high data-rate applications.

In the current architecture, the packet scheduler is located in the RNC and therefore is limited in the ability of the packet scheduler to adapt to the instantaneous traffic, because of bandwidth constraints on the RRC signaling interface between the RNC and the UE. Hence, to accommodate the variability, the packet scheduler must be conservative in allocating uplink power to take into account the influence from inactive users in the following scheduling period—a solution which turns out to be spectrally inefficient for high allocated data-rates and long release timer values.

Thus, with E-DCH much of the packet scheduler functionality is transferred to the Node B, i.e., there is a Node B scheduler that is responsible for allocating uplink resources. For the scheduling to be performed efficiently, the Node B needs to obtain some information from the UE. In 3GPP a so called 'happy bit' is defined, which is included in the E-DPCCH. The happy bit is always sent, and can indicate either "UP" (also called "unhappy") or "KEEP" (also called "happy"). When the UE sends an "UP" request, the request means that the UE desires to obtain a higher bit rate (i.e., is "unhappy" with the current bit rate), while when the UE sends a "KEEP" request, this request means the UE is satisfied with (i.e., is "happy" with) the current bit rate.

3GPP defines that the UP-request (e.g., unhappy status) can be sent as follows:

The Happy Bit shall be set to "unhappy" if both of the following criteria are met:
UE has enough power available to transmit at higher E-DPDCH to DPCCH ratios than what is allowed by the current Serving_Grant; and
Total buffer status would require more than Happy_Bit_Delay_Condition milliseconds (ms) to be transmitted with the current Serving_Grant.

Reference in this regard can be had to Section 11.8.1.5 of 3GPP TS 25.321, 3rd Generation Partnership Project; Technical Specification Group Radio Access Network; Medium Access Control (MAC) protocol specification (Release 6) (version 6.5.0) (2005-06).

A problem arises in defining the criteria of when the UE has power available to send at higher data rates (e.g., bit rates).

The E-TFCs are defined to have very small steps between them in order to have a relatively good fit to whatever size and number of higher layer data packets (SDUs) are to be transmitted. The small steps occur in transport block sizes of the transport blocks of the E-TFCs. However, the problem in the definition is that if the UE is currently transmitting with an E-TFC Y (e.g., transmitting a specific transport block size), then if the UE has enough power to transmit with E-TFC Y+1 (e.g., transmitting a slightly larger transport block size), the UE should not indicate "unhappy". This is because the next E-TFC can, in a practical sense, almost never accommodate one more SDU, and thus cannot be used to transmit with a higher data rate. For instance, a slightly larger transport block size typically cannot accommodate another SDU.

Thus, the basic problem is that the data from higher layers come to the MAC in specific sized SDUs, and increasing the transmitted data rate means transmitting one or several additional SDU(s) in one transport block (e.g., in one E-TFC).

BRIEF SUMMARY

In an exemplary embodiment, a method is disclosed that includes, in response to selection of a transport block to be transmitted through a wireless channel at a current data rate, performing at least the following: selecting a size for a data unit that can be scheduled for transmission; identifying one of a plurality of potential transport blocks, the identified potential transport block having a corresponding transport block size large enough to hold at least the selected size of the data unit and the transport block size of the currently selected transport block; determining whether the identified potential transport block is available for transmission; and transmitting a request for an increase in the current data rate in response to the identified potential transport block being available for transmission.

In another exemplary embodiment, an apparatus is disclosed that includes a processing unit configured, responsive to selection of a transport block to be transmitted through a wireless channel at a current data rate, to perform an operation to select a size for a data unit that can be scheduled for transmission, to perform an operation to identify one of a plurality of potential transport blocks, the identified potential transport block having a corresponding transport block size large enough to hold at least the selected size of the data unit and the transport block size of the currently selected transport block, to perform an operation to determine whether the identified potential transport block is available for transmission, and to perform an operation to transmit a request for an increase in the current data rate in response to the identified potential transport block being available for transmission.

In a further exemplary embodiment, a computer program product is disclosed that tangibly embodies a program of machine-readable instructions executable by at least one data processor to perform operations. The operations include, in response to selection of a transport block to be transmitted through a wireless channel at a current data rate, performing at least the following: selecting a size for a data unit that can be scheduled for transmission; identifying one of a plurality of potential transport blocks, the identified potential transport block having a corresponding transport block size large enough to hold at least the selected size of the data unit and the transport block size of the currently selected transport block; determining whether the identified potential transport block is available for transmission; and causing transmission of a request for an increase in the current data rate in response to the identified potential transport block being available for transmission.

In an additional exemplary embodiment, an apparatus is disclosed. Responsive to selection of a transport block to be transmitted through a wireless channel at a current data rate, at least the following means are operated: means for selecting a size for a data unit that can be scheduled for transmission; means for identifying one of a plurality of potential transport blocks, the identified potential transport block having a corresponding transport block size large enough to hold at least the selected size of the data unit and the transport block size of the currently selected transport block; means for determining whether the identified potential transport block is available for transmission; and means for transmitting a request for an increase in the current data rate in response to the identified potential transport block being available for transmission.

In another exemplary embodiment, a method includes, for an enhanced uplink dedicated channel (E-DCH) transmission, setting at least one bit to a state indicating a request for a higher data rate if at least the following criterion is met: a user equipment has enough power available to transmit at a data rate higher than a current data rate. Assessment of whether the user equipment has enough power available includes identifying an E-DCH transport format combination (E-TFC) having a transport block size at least x bits larger than a transport block size of an E-TFC selected for transmission in a transmission timing interval (TTI) in which the at least one bit is to be transmitted, where x is a smallest radio link control (RLC) protocol data unit (PDU) size configured among all logical channels that do not belong to non-scheduled MAC-d (medium access control-d) flows and that have data in a buffer. Assessment also includes, based on a power offset of the selected E-TFC, checking that the identified E-TFC is supported.

In a further exemplary embodiment, an apparatus includes a processing unit configured, for an enhanced uplink dedicated channel (E-DCH) transmission, to set at least one bit to a state indicating a request for a higher data rate if at least the following criterion is met: a user equipment has enough power available to transmit at a data rate higher than a current data rate. The processing unit is configured to assess whether the user equipment has enough power available through the following: the processing unit configured to identify an E-DCH transport format combination (E-TFC) having a transport block size at least x bits larger than a transport block size of an E-TFC selected for transmission in a transmission timing interval (TTI) in which the at least one bit is to be transmitted, where x is a smallest radio link control (RLC) protocol data unit (PDU) size configured among all logical channels that do not belong to non-scheduled MAC-d (medium access control-d) flows and that have data in a buffer; and the processing unit configured, based on a power offset of the selected E-TFC, to check that the identified E-TFC is supported.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

An exemplary problem that is solved by the use of the exemplary embodiments of this invention is how to define, assuming that the UE is currently transmitting with E-TFC Y (e.g., characterized with a specific transport block size), what is the E-TFC Y+X with the smallest possible (e.g., positive integer) value of X (also shown as x below) that allows transmitting with a higher data rate. That is, what is the supported (e.g., not blocked, can be transmitted) E-TFC Y+X that can fit one more SDU than the E-TFC Y?

The exemplary embodiments of this invention relate at least in part to providing an enhancement of the uplink DCH (E-DCH) for packet data traffic in, for example, 3GPP TS 25.309, 3rd Generation Partnership Project; Technical Specification Group Radio Access Network; FDD Enhanced Uplink; Overall Description; Stage 2 (Release 6) (version 6.10.0) (2004-12). Although exemplary embodiments described herein use the E-DCH as examples, the disclosed invention is not limited thereto.

Figure 1:
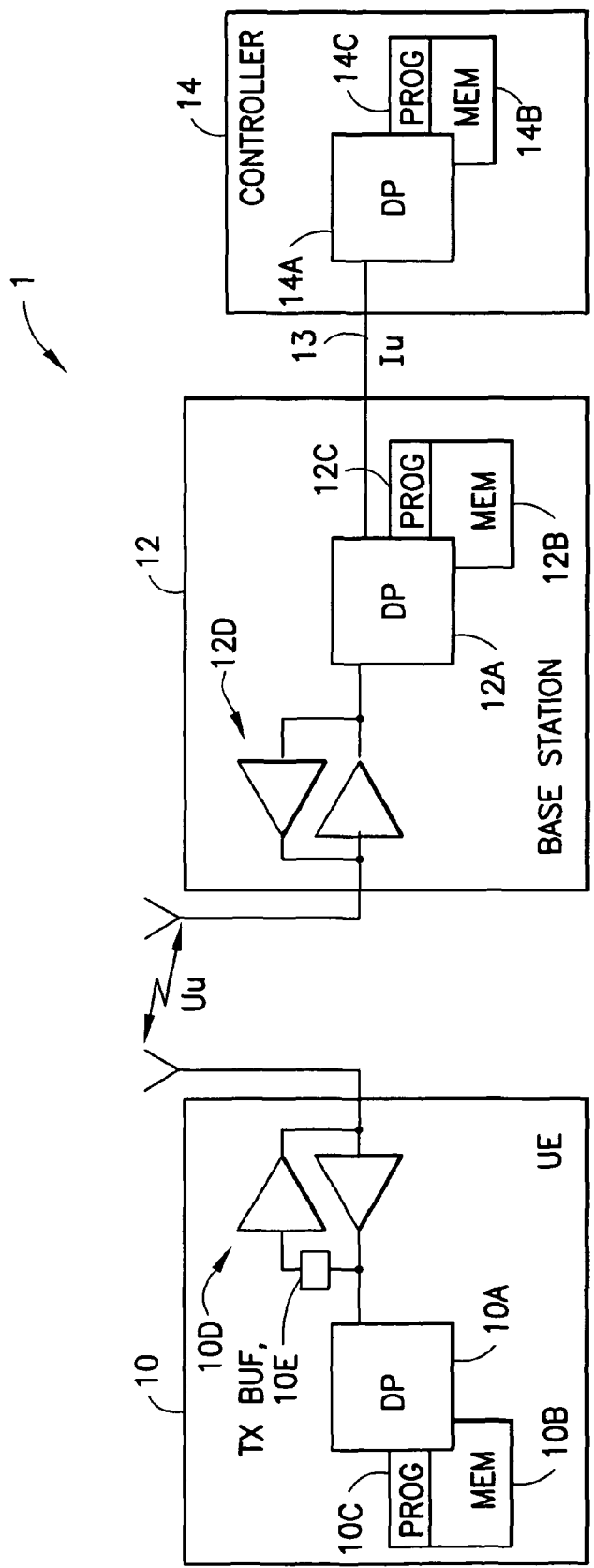
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1, a wireless network 1 includes a UE 10, a base station (e.g., Node B) 12 and a controller 14 (e.g., an RNC) for the wireless network 1. The UE 10 includes a data processor (DP) 10A, a memory (MEM) 10B that stores a program (PROG) 10C, and a suitable radio frequency (RF) transceiver 10D for bidirectional wireless communications with the base station (e.g., Node B) 12, which also includes a DP 12A, a MEM 12B that stores a PROG 12C, and a suitable RF transceiver 12D. The base station 12 is coupled via a data path 13 to the controller 14 that also includes a DP 14A and a MEM 14B storing an associated PROG 14C. At least the PROG 10C is assumed to include program instructions that, when executed by the associated DP 10A, enable the UE 10 to operate in accordance with the exemplary embodiments of this invention, as will be discussed below in greater detail.

As shown in FIG. 1, the Uu interface is the interface between UMTS (Universal Mobile Telecommunications System) Terrestrial Radio Access Network (UTRAN) and the UE 10. The UTRAN typically includes one or more base stations 12, such as Node Bs, and one or more controllers 14, such as RNCs or Base Station Controllers. The data path 13 includes the Iu, which is the interconnection point between the controller 14 (e.g., RNC, a BSC) and 3G (Third Generation) core network (CN) (not shown in FIG. 1). Also shown in FIG. 1 is a UE transmission buffer (Tx_BUF) 10E, that is referred to below. It is noted that the transmission buffer 10E may be part of the memory 10B, if desired.

In general, the various embodiments of the apparatus UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and the other DPs, or by hardware, or by a combination of software and hardware. The MEMs 10B, 12B, and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, and 14A may be of any type suitable to the local technical environment, and may include one or more of general purpose computers, special purpose computers, microprocessors, digital signal processors (DSPs) and processors based on a multi-core processor architecture, as non-limiting examples. The MEMs 10B, 12B, and 14B may contain machine-readable instructions from computer program product tangibly embodying a program of the machine-readable instructions, which are executable by at least one data processor 10C, 12C, 14C to perform operations described herein. Such a computer program product may include a compact disk (CD), digital versatile disk (DVD), memory stick, or any other product suitable for containing a program of machine-readable instructions.

Describing now in further detail the exemplary embodiments of this invention, there is provided in an exemplary embodiment a rule for identifying the E-TFC that enables transmitting more SDU(s) than the currently granted E-TFC. This rule is in contradistinction to simply checking if the UE 10 has sufficient power to transmit the next larger E-TFC (e.g., characterized by a slightly larger transport block size than the transport block size of the current E-TFC), which would not allow actually transmitting any more data than the current E-TFC. This is true because another SDU typically cannot fit into the space difference between the slightly larger transport block size of the next larger E-TFC and the slightly smaller transport block size of the current E-TFC.

It is also pointed out that there may be multiple implementation alternatives as the UE 10 may be simultaneously configured with multiple services (e.g., logical channels) that may be using different RLC PDU sizes. However, the different alternatives should all converge to the same solution if only one RLC PDU size is used, which is typically the case.

Figure 2:
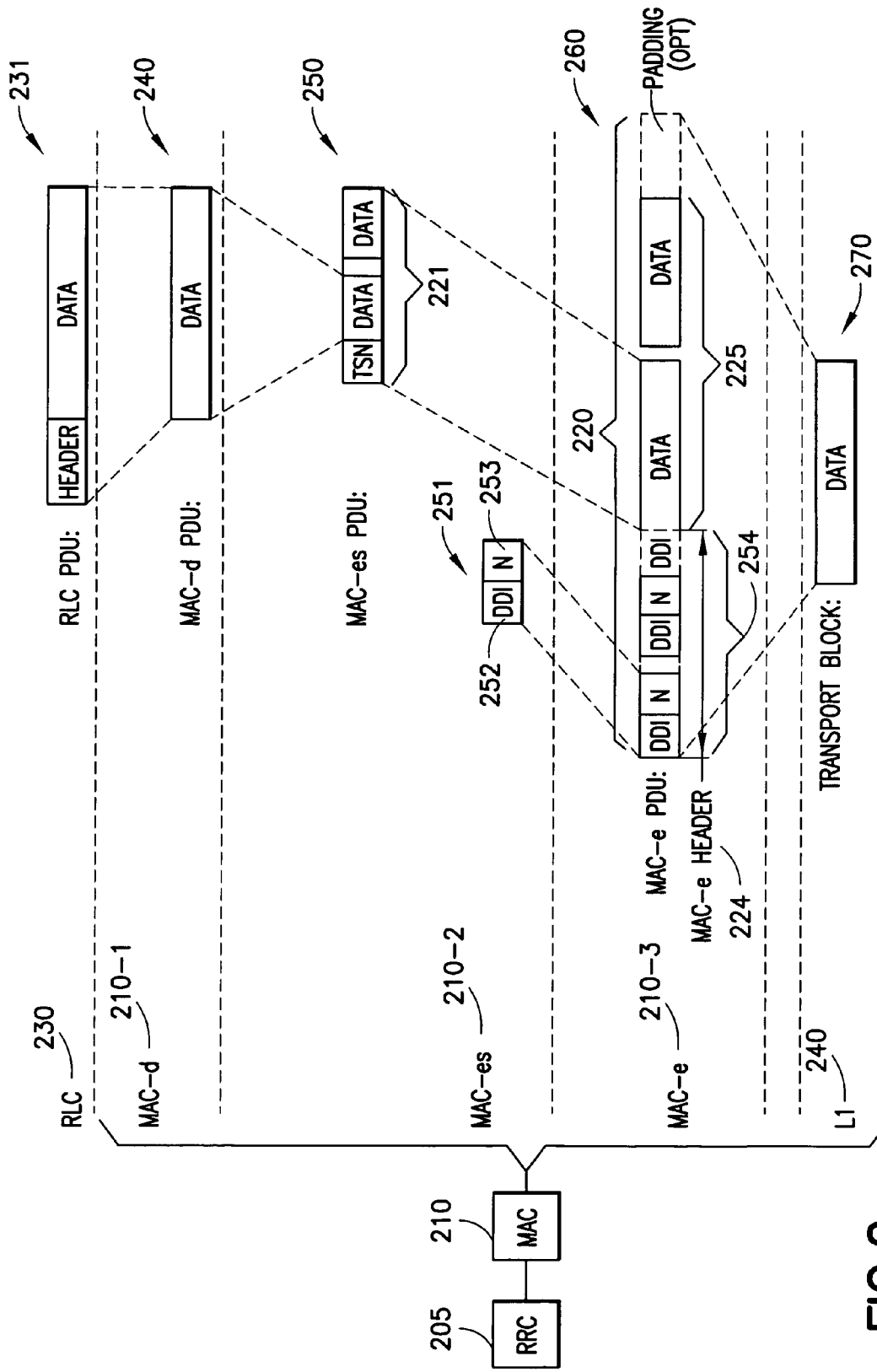
FIG. 2 illustrates RLC PDUs mapped onto an E-DCH transport block.

FIG. 2 illustrates how one or multiple RLC PDUs are mapped to one E-DCH transport block 270. A MAC entity 210, as part of PROG 10C, has a number of sub-entities, of which the MAC-d 210-1, MAC-es 210-2, and MAC-e 210-3 are shown. The MAC entity 210 is typically configured by the RRC 205, which is also part of PROG 10C. Also shown in FIG. 2 is the RLC entity 230 and the L1 entity 240. It is noted that the RLC entity 230 and the L1 entity 240 are also part of PROG 10C. Each entity 230, 210-1, 210-2, 210-3, and 240 is also considered to be a layer, with the RLC entity 230 being the topmost layer and the L1 entity 240 being the lowest layer. Information therefore travels in the uplink from the topmost layer, RLC entity 230, to the lowest layer, L1 entity 240. In FIG. 2, and as defined in 3GPP TS 25.321, Section 4.2.3, the MAC-d entity 210-1 controls access to all dedicated transport channels, while the MAC-e/es entities 210-2, 210-3 (commonly referred to as a single MAC-e/es entity) controls access to the E-DCH transport channel.

The RLC entity 230 produces an RLC PDU 231, the MAC-d entity 210-1 produces a MAC-d PDU 240, the MAC-es entity 210-2 produces header information 251 and a MAC-es PDU 250, and the MAC-e entity 210-3 produces a MAC-e PDU 260. Header information 251 is called a [DDI,N] couple and includes the Data Description Indicator (DDI) field 252 and the N field 253. According to section 9.2.4.2, entitled "MAC-e header parameters", of 3GPP TS 25.321 (Release 6) (version 6.5.0) (2005-06), the DDI field 252 identifies the logical channel, MAC-d flow and size of the MAC-d PDUs concatenated into the associated MAC-es PDU 250. The mapping between the DDI values (e.g., in the DDI fields 252) and the logical channel ID, MAC-d flow and PDU size is provided by higher layers. The length of the DDI field 252 is 6 bits. The N field 253 indicates the number of consecutive MAC-d PDUs corresponding to the same DDI value. The length of the N field is 6 bits. It can be seen that the MAC-e header 224 includes multiple [DDI,N] couples from multiple header information 251.

It is noted that an SDU is a data unit that enters a layer and a PDU is a data unit that exits a layer. In terms of the MAC-d entity 210-1, the SDU refers to the RLC PDU 231 (i.e., where RLC entity 230 is a layer above the MAC-d entity 210-1 and produces the RLC PDU 231 that is an SDU input to the MAC-d entity 210-1). The MAC-d entity 210-1 then uses the SDU (i.e., RLC PDU 231) to create the MAC-d PDU 240, which is itself an SDU of the MAC-es entity 210-2. Therefore, the terms SDU and PDU will be used interchangeably and each refers to an appropriate data unit for the particular layer being described.

In order to enable a higher data rate transmission, more RLC PDUs 231 must fit to a single transport block 270 of the L1 entity 240. This means that the transport block size 220 of the MAC-e PDU 260 must be increased by at least the size of one RLC PDU 231. As the MAC-e header 224 might be a fixed size, the transport block size could be considered to be the size of the data portion 225 of the MAC-e PDU 260. As another example, the MAC-es PDU 250 also comprises a size 221, and the size 221 might be increased to a size suitable to hold another RLC PDU 231. In an exemplary embodiment, a transport block size for a layer includes only the data portion, such as data portion 225, although the transport block size could include the size of any header (e.g., MAC-e header 224) and padding, if used. In another exemplary embodiment, when adding one more RLC PDU 231, the header (e.g., MAC-e header 224) may or may not change depending on to which logical channel the RLC PDU 231 belongs:

if the RLC PDU 231 belongs to a logical channel for which a DDI is already included, the N is increased and the header size 254 does not change;

if the RLC PDU 231 belongs to a logical channel for which a DDI was not included (i.e., new RLC PDU size or new logical channel), a new [DDI,N] couple (e.g., header information 251) is required. This new [DDI,N] couple will increase the size 254 of the MAC-e header 224. The size increase of the MAC-e header 224 will therefore be implicated in the identification of the E-TFC that has a transport block size X bits larger than a selected E-TFC (see, e.g., Block 510 of FIG. 5, described below).

It is noted that the MAC-e PDU 260 is a transport block for the MAC-e entity 210-3. Similarly, the MAC-es PDU 250 is a transport block for the MAC-es entity 210-2.

The following should be noted with regard to the exemplary embodiments discussed below.

First, the current E-TFC refers to the E-TFC with the largest transport block size currently allowed to be selected (in E-TFC selection, E-TFCS) to transmit data in the same TTI as the happy bit (e.g., based on the configured E-TFCS, selected power offset and serving grant controlled by the scheduler). Alternatively, the current E-TFC refers to the E-TFC selected in E-TFC selection to transmit data in the same TTI as the happy bit (e.g., based on the configured E-TFCS, list of supported E-TFCs, selected power offset, scheduling grant controlled by the scheduler, and amount of non-scheduled data to be transmitted). E-TFC selection is described, e.g., in section 11.8.1.4 of 3GPP TS 25.321 (Release 6) (version 6.5.0) (2005-06).

Second, a scheduled logical channel is a logical channel that does not belong to a non-scheduled MAC-d flow. As is defined 3GPP TS 25.321, Section 4.2.3, the MAC-d controls access to all dedicated transport channels. Additionally, in the uplink, if logical channels of dedicated type are mapped to common transport channels, then MAC-d submits the data to MAC-es/e. The mapping of logical channels on transport channels depends on the multiplexing that is configured by RRC. According to the RRC functions, the RRC is generally in control of the internal configuration of the MAC.

Third, the same power offset is assumed as the power offset selected during E-TFC selection of the E-TFC selected to transmit data in the same TTI as the happy bit. As described in section 3.1.2 of 3GPP TS 25.321 (Release 6) (version 6.5.0) (2005-06), the power offset is a power offset between E-DP-DCH(s) and a reference E-DPDCH power level for a given E-TFC. A power offset attribute is set to achieve the required Quality of Service (QoS) in a MAC-d flow when carried alone in a MAC-e PDU and subsequently in the corresponding Coded Composite Transport Channel (CCTrCh) of E-DCH type. The reference E-DPDCH power offset is signaled to the UE for one or several reference E-TFC(s). Typically, the power offset for the transmission is the power offset corresponding to a hybrid automatic request (HARQ) profile of the MAC-d flow that allows highest-priority data to be transmitted. If more than one MAC-d flow allows data of the same highest priority to be transmitted, it is left to implementation to select which MAC-d flow to prefer.

Fourth, the data in the transmission buffer 10E refers to the data in the UE transmission buffer 10E that belongs to scheduled MAC-d flows.

In accordance with an exemplary embodiment of this invention, the UE 10 operates (in accordance with PROG 10C) as follows.

Identify if the current E-TFC can deliver all the data in the transmission buffer 10E at or below the time interval defined by the Happy_Bit_Delay_Condition:

({data in the buffer [bits]*$TTI$ length [ms]}/current
E-TFC transport block size [bits]$\leq$Happy_Bit_
Delay_Condition).

Identify if there exists an E-TFC with a transport block large enough to allow one more RLC PDU than the current E-TFC to be transmitted. While five different rules for this identification are given below, in practice only one may be selected for use and implemented.

1. Identify the E-TFC that has a transport block size X bits larger than the current E-TFC's transport block size, where X is the smallest RLC PDU size configured among all the logical channels that are scheduled.

2. Identify the E-TFC that has a transport block size X bits larger than the current E-TFC's transport block size, where X is the largest RLC PDU size configured among all the logical channels that are scheduled.

3. Identify the E-TFC that has a transport block size X bits larger than the current E-TFC's transport block size, where X is the RLC PDU size configured for the highest priority logical channel that can be scheduled.

4. Identify the E-TFC that has a transport block size X bits larger than the current E-TFC's transport block size, where X is the RLC PDU size configured for the highest priority logical channel that can be scheduled and that has data in the transmission buffer 10E of the UE 10.

5. Identify the E-TFC that has a transport block size X bits larger than the current E-TFC's transport block size, where X is the smallest RLC PDU size configured among the logical channels that can be scheduled and have data in the UE's transmission buffer 10E.

After identifying the E-TFC that allows transmitting with a higher data rate, the UE 10 then evaluates whether the UE has suitable power to actually transmit with that data rate (e.g., that the E-TFC is not blocked and is therefore supported). If the result of this evaluation is favorable, and if the amount of data in the buffer criterion is met, i.e., the current E-TFC cannot deliver the data in the UE's buffer at or below the Happy_Bit_Delay_Condition, the UE 10 sets the 'happy bit' to 'unhappy', i.e. the UE 10 sends an "UP" request to the base station 12.

Note that the foregoing criteria differ from those published in R2-050179, 3GPP TSG-RAN WG2 Meeting #45bis, Sophia Antipolis, France, 10-14 January 2005, where in Section 2.3 (UE behaviour) the proposed condition for setting the happy bit to "UP" (e.g., "unhappy") would be:

the UE has more data in the buffer (e.g., total buffer) of the UE than the UE can send with the current bit rate in x TTIs (where x is network configurable if needed), and the UE has enough power and other capabilities to transmit at the higher bit rate. The happy bit would then be set at every TTI for which the above two conditions were met.

It can also be noted that currently the bits of the MAC header (e.g., header 224) are not taken into account in E-TFC selection, but if the bits of the MAC header were taken into account the value of X above should be increased by the corresponding number of added bits for the MAC header.

Further with regard to the buffer aspects discussed above, and referring also to FIG. 3 (e.g., performed by PROG 10C of FIG. 1), the following points can further illustrated.

Block 3A. First the UE 10 checks whether the amount of data in the buffer criterion is met. This is done so that if the UE 10 cannot transmit, with the current (maximum allowed by the scheduler) E-TFC, all the (scheduled) data in the buffer of the UE at or below the Delay_Condition, then the UE has enough data in the buffer. In detail this may be expressed as:

data_in_the_buffer/data_rate=<delay condition, where
data_in_the_buffer is the amount data of scheduled MAC-d flows in bits; and
data_rate is the transport block size of the current (maximum allowed by the scheduler) E-TFC/TTI length.

Block 3B. Then the UE 10 detects what is the next E-TFC above the current (maximum allowed by the scheduler) E-TFC that can actually transmit a larger number of RLC PDUs. The first step is to identify what RLC PDU size to use. This identification of what RLC PDU size to use can be accomplished through the use of one of the five rules described above.

Figure 3:
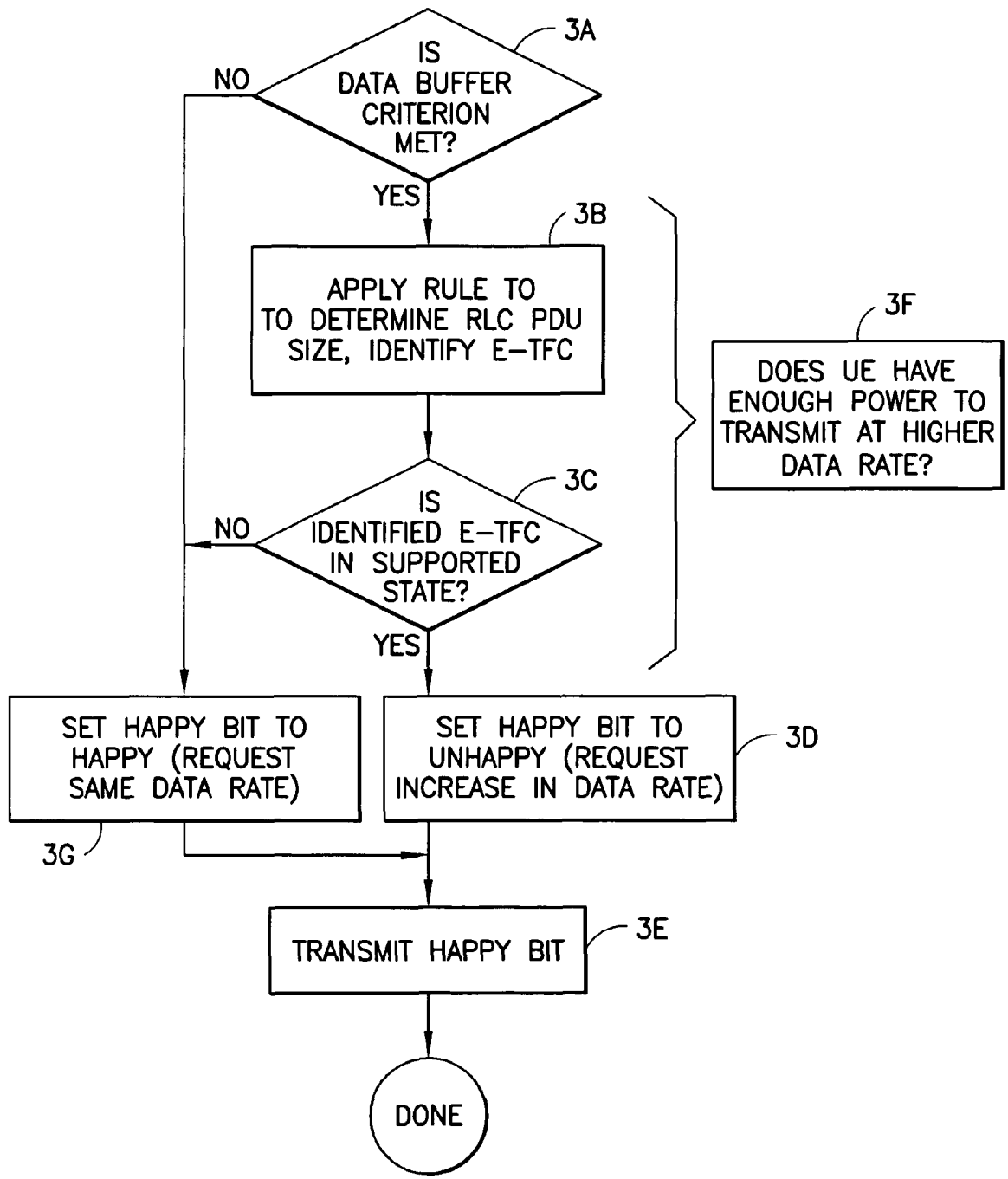
FIG. 3 is a logic flow diagram that is useful in explaining the operation of exemplary embodiments of this invention.
Figure 5:
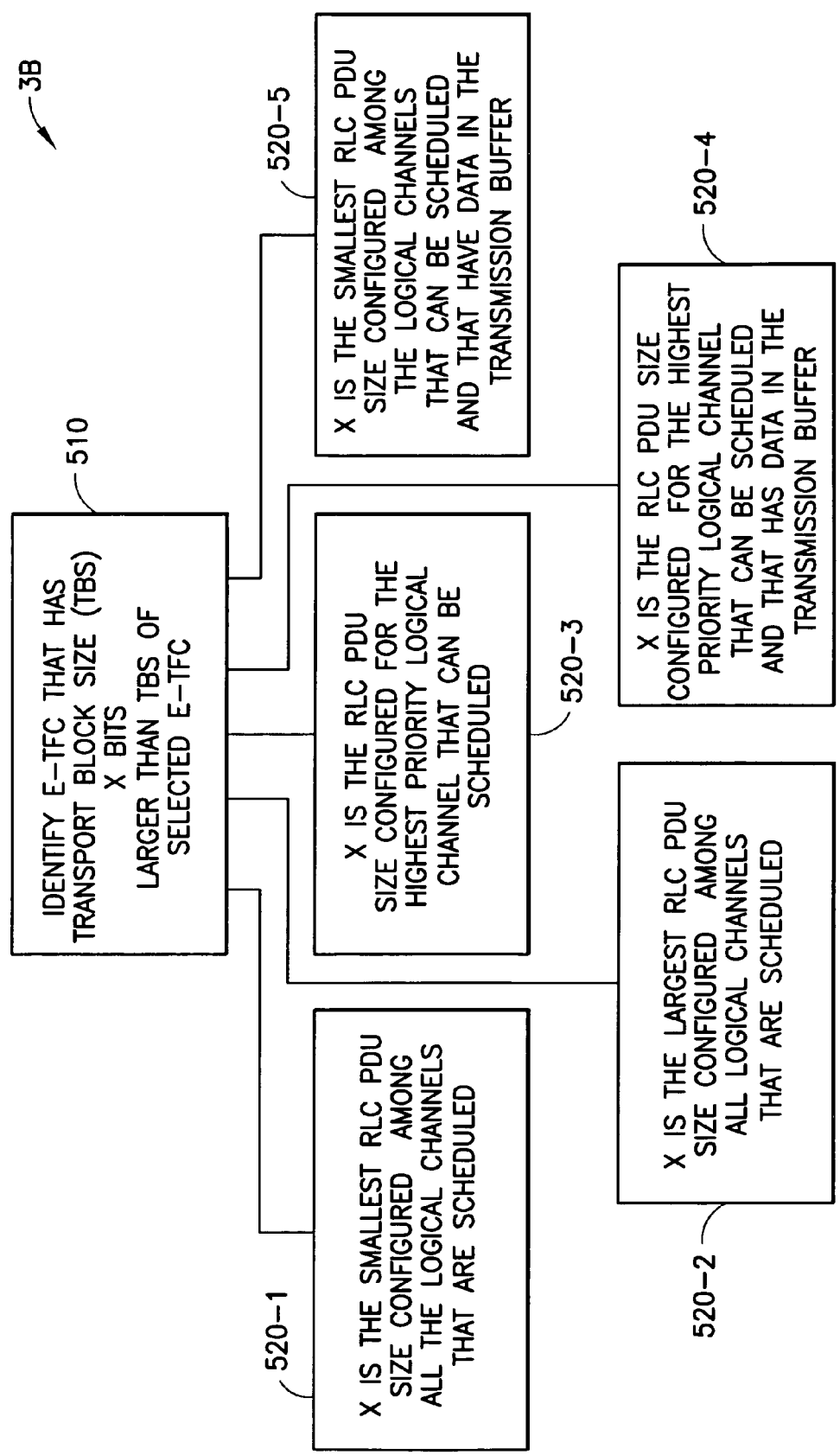
FIG. 5 is a logic flow diagram of block 3B of FIG. 3.

In particular, turning to FIG. 5 in addition to FIG. 3, FIG. 5 shows one example of how Block 3B might be performed. In Block 510, identification is made of an E-TFC that has a transport block size X (or "x") bits larger than a transport block size of a selected E-TFC. The selected E-TFC is an E-TFC selected for transmission in a transmission timing interval (TTI) in which the Happy Bit is to be transmitted. Each of Blocks 520 is a rule that determines the size of X:

In Block 520-1, X is determined to be the smallest RLC PDU size configured among all the logical channels that are scheduled (e.g., to be transmitted).

In Block 520-2, X is determined to be the largest RLC PDU size configured among all the logical channels that are scheduled (e.g., to be transmitted).

In Block 520-3, X is determined to be the RLC PDU size configured for the highest priority logical channel that can be scheduled (e.g., to be transmitted).

In Block 520-4, X is determined to be the RLC PDU size configured for the highest priority logical channel that can be scheduled (e.g., to be transmitted) and that has data in the transmission buffer 10E of the UE 10.

In Block 520-5, X is determined to be the smallest RLC PDU size configured among the logical channels that can be scheduled (e.g., to be transmitted) and have data in the UE's transmission buffer 10E.

It was noted above that the if an RLC PDU 231 belongs to a logical channel for which a DDI was not included (i.e.; new RLC PDU size or new logical channel), a new [DDI,N] couple (e.g.; header information 251) is required. This new [DDI,N] couple will increase the size 254 of the MAC-e header 224. Thus, if the RLC PDU 231 chosen in Block 520 belongs to a logical channel for which a DDI was not included, then Block 510 will take the increase in size 254 of the MAC-e header 224 into account when identifying an appropriate E-TFC.

Block 3C. A determination is then made if the E-TFC identified in step 2 is in a supported state (e.g., the identified E-TFC is not in a blocked state). If the identified E-TFC is in a supported state, the identified E-TFC can be considered to be available for transmission, as an E-TFC in a supported state not only means that E-TFC is not blocked but also means the UE has enough power to transmit the identified E-TFC. For instance, as described in section 11.8.1.4 of 3GPP TS 25.321 (Release 6) (version 6.5.0) (2005-06), at each TTI boundary, UEs in the CELL_DCH state with an E-DCH transport channel configured shall determine the state (e.g., either supported or blocked) of each E-TFC for every MAC-d flow configured based on the required transmit power of the E-TFC versus the maximum UE transmit power. Therefore, an identified E-TFC in a supported state means the UE has enough power to transmit the identified E-TFC. An E-TFC in a supported state therefore indicates that the E-TFC is available for transmission.

Block 3D. If both Blocks 3A and 3B indicate YES, then set the happy bit to "unhappy" (e.g., or "Up") in order to request an increase in data rate.

Block 3G. 1f either Block 3A or 3C is now, the Happy Bit is set to "happy" (e.g., "Keep"), requesting the same data rate (e.g., indicating that the current data rate is suitable).

Block 3E. The UE 10 transmits the Happy Bit to, e.g., the base station 12. It is noted that Happy Bit is transmitted using out-of-band signaling that is sent using means other than used to send the actual data. For instance, the E-DPCCH is code multiplexed with the E-DPDCH: the E-DPDCH carries the data and layer two (L2) information, while E-DPCCH carries the Happy Bit, E-TFCI (E-DCH Transport Format Combination Indicator) and retransmission sequence number related to the data transmission.

It is noted that Blocks 3B and 3C can be considered to be Block 3F, in which it is determined if UE 10 has enough power to transmit at a higher data rate (e.g., relative to a current data rate). Note that block 3B identifies a larger potential E-TFC than a currently selected (and to be transmitted) E-TFC, and this identification also selects a data rate (e.g., based on a transmission of the E-TFC within a TTI). Block 3C then determines whether the larger potential E-TFC can be transmitted by being in a supported state (e.g., potential E-TFC is not blocked). It is noted that a UE has enough power to transmit an E-TFC that is in a supported state (e.g., the supported state itself indicates that there is enough power to transmit the E-TFC, as the UE has gone through a process to determine whether the UE has enough power to transmit the E-TFC, and E-TFCs are in a supported state if the UE has enough power to transmit the E-TFC).

Figure 4:
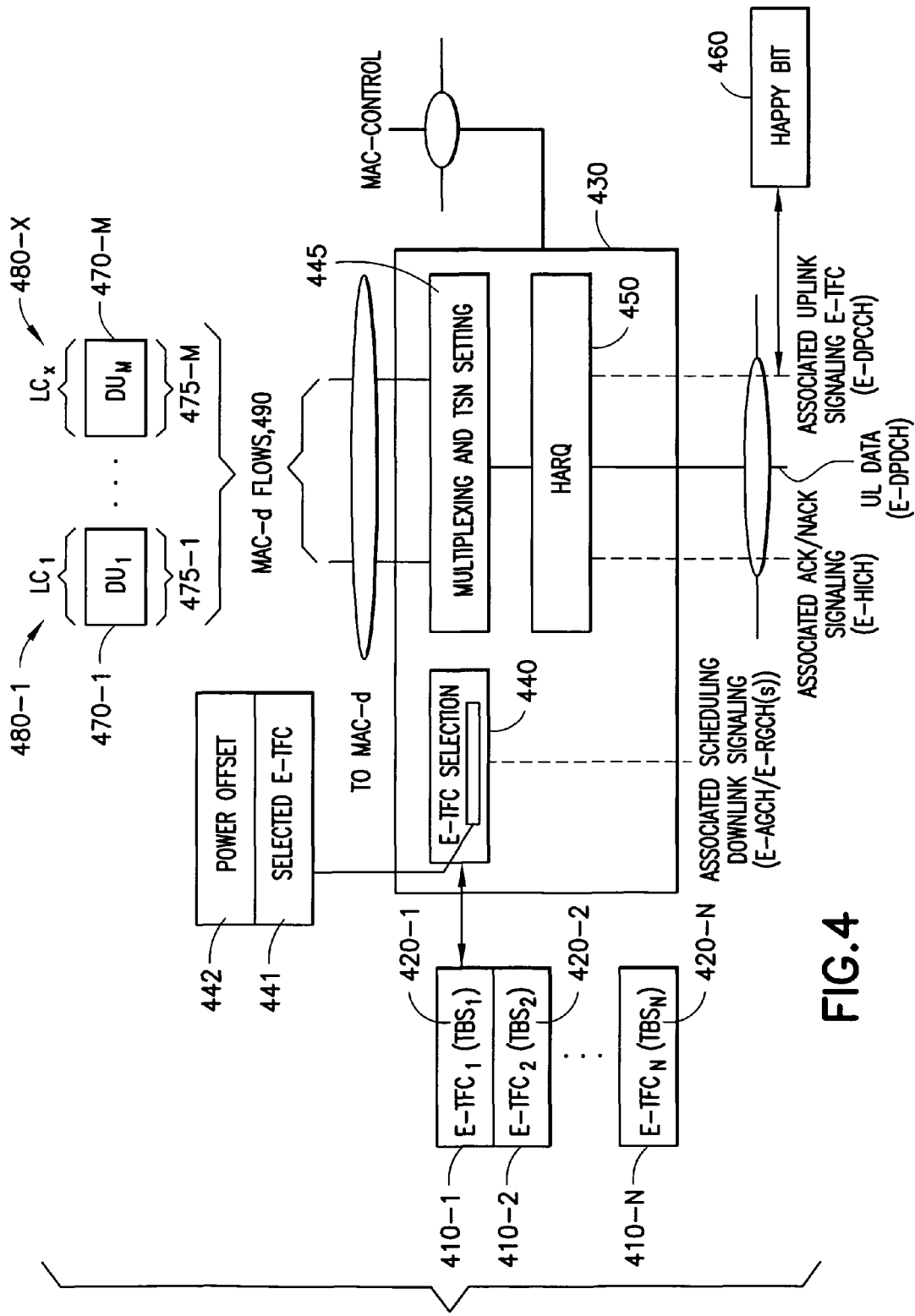
FIG. 4 is a block diagram of an MAC-es/e entity coupled to other entities and signaling channels.

Turning to FIG. 4 with appropriate reference to FIGS. 1-3 and 5, FIG. 4 is a block diagram of an MAC-es/e entity 430 coupled to other entities and signaling channels. The MAC-es/e entity 430 corresponds to both the MAC-es entity 210-2 and the MAC-e entity 210-3 of FIG. 2 and is part of PROG 10C. It is noted that FIG. 4 is a modified version of FIG. 4.2.3.4.1 of section 4.2.3.4, entitled "MAC-e/es entity—UE Side", of 3GPP TS 25.321, 3rd Generation Partnership Project; Technical Specification Group Radio Access Network; Medium Access Control (MAC) protocol specification (Release 6) (version 6.5.0) (2005-06).

The MAC-es/e entity 430 comprises an E-TFC selection entity 440, a multiplexing and TSN (Transmission Sequence Number) setting entity 445, and a HARQ (hybrid automatic request) entity 450. FIG. 4 shows that the MAC-es/e entity 430 is coupled to the MAC-d entity (e.g., MAC-d entity 210-1) and to MAC-control (e.g., from RRC), and is coupled to a number of channels, including the E-DPCDH and the E-DPCCH. Data (e.g., the MAC-e PDU 260, which is converted to a transport block 270 using the L1 entity 240) is transmitted using the E-DPDCH and the Happy Bit 460 is transmitted using the E-DPCCH.

The MAC-es/e entity 430 receives MAC-d flows 490. The MAC-d flows 490 correspond to data units (DUs) 470-1 through 470-M, where each data unit 470 corresponds to an RLC PDU 231 in this example. Each data unit 470 has a corresponding size 475. The data units 470 also correspond to logical channels (LCs) 480-1 through 480-X. There may or may not be a one-to-one correspondence between the data units 470 and the logical channels 480. As is shown in FIG. 2, the data units 470 would be packaged by the MAC-d entity 210-1 into MAC-d PDUs 240. Therefore, the MAC-d flows 490 comprise MAC-d PDUs 240.

As described in section 4.2.3.4 of 3GPP TS 25.321 (using numbering from FIG. 4 herein):

The HARQ entity (e.g., HARQ entity 450) is responsible for handling the MAC functions relating to the HARQ protocol. It is responsible for storing MAC-e payloads and retransmitting the payloads. The detailed configuration of the hybrid ARQ protocol is provided by RRC over the MAC-Control SAP (Service Access Point). The HARQ entity provides the E-TFC, the retransmission sequence number (RSN), and the power offset to be used by layer 1 (L1) (e.g., L1 entity 240).

The multiplexing and TSN setting entity (e.g., entity 445) is responsible for concatenating multiple MAC-d PDUs into MAC-es PDUs, and to multiplex one or multiple MAC-es PDUs into a single MAC-e PDU, to be transmitted in the next TTI, as instructed by the E-TFC selection finction. It is also responsible for managing and setting the TSN per logical channel for each MAC-es PDU.

The E-TFC selection entity (entity 440) is responsible for E-TFC selection according to the scheduling information (Relative Grants and Absolute Grants) received from UTRAN via layer 1 (L1) and Serving Grant value signaled through RRC, and for arbitration among the different flows mapped on the E-DCH. The detailed configuration of the E-TFC entity is provided by RRC over the MAC-Control SAP (Service Access Point). The E-TFC selection finction controls the multiplexing function.

In the example of FIG. 4, the E-TFC selection entity 440 is modified to perform at least in part the methods (e.g., of FIGS. 3 and 5) and techniques presented herein. In another embodiment, the methods and techniques presented herein are performed at least in part by another entity (not shown in FIG. 4) that provides input to, e.g., E-TFC selection entity 440. In another exemplary embodiment, the method and techniques presented herein are performed at least in part by one or more of entities 440, 445, or 450. In yet another embodiment, an entity outside the MAC-es/e entity 430 performs the methods and techniques presented herein and provides input to the MAC-es/e entity 430.

Assuming the E-TFC selection entity 440 is modified to perform the methods of FIGS. 3 and 5, the E-TFC selection entity 440 is able to choose between a number of potential E-TFCs 410, E-TFCs 410-1 through 410-N, each of which has a corresponding transport block size (TBS) 420-1 through 420-N. Each transport block size 420 corresponds to one of the transport block sizes 220, 221, or 225. Using the rules in, e.g., FIG. 5, the E-TFC selection entity 440 selects an appropriate potential E-TFC 410 with an appropriate transport block size 420. The E-TFC selection entity 440 also has determined an E-TFC 441 selected for transmission in a transmission timing interval (TTI) in which the Happy Bit is to be transmitted and has determined a power offset 442 for the selected E-TFC 442. As described above, the selected E-TFC 441 and power offset 442 are used when determining whether the UE 10 has enough power to transmit at a higher data rate (e.g., using a transport block size suitable for holding at least one more data unit, such as an RLC PDU 231). It should be noted that the E-TFCs 410 are potential E-TFCs that are suitable for transmission (e.g., able to be transmitted) and are used to select a corresponding transport block size 420 suitable for transmission at a higher rate. Such potential E-TFCs typically will not be transmitted in the next TTI but could be transmitted in the next TTI assuming the potential E-TFCs are available for transmission (e.g., supported, which also indicates that the UE has enough power to transmit an E-TFC). Meanwhile, the selected E-TFC 441 is an E-TFC that is selected to be transmitted and that is scheduled to be transmitted in the next TTI.

The various rules described above and described again in FIG. 5 are now discussed further and illustrated by the use of examples.

First assume two services A and B that are employed by the UE 10, where A has a PDU of 200 bits and a higher priority and B has a PDU of 100 bits and a lower priority. The individual ones of the five rules then would be applied as follows.

1. Identify the E-TFC that has a transport block size X bits larger than the current E-TFC's transport block size, where X is the smallest RLC PDU size configured among all the logical channels that are scheduled. In this case, X=min (100, 200), i.e. X=100 bits.

2. Identify the E-TFC that has a transport block size X bits larger than the current E-TFC's transport block size, where X is the largest RLC PDU size configured among all the logical channels that are scheduled. In this case, X=max (100, 200), i.e. X=200 bits.

3. Identify the E-TFC that has a transport block size X bits larger than the current E-TFC's transport block size, where X is the RLC PDU size configured for the highest priority logical channel that can be scheduled. In this case X=PDU size of the highest priority, i.e. X=200 bits.

4. Identify the E-TFC that has a transport block size X bits larger than the current E-TFC's transport block size, where X is the RLC PDU size configured for the highest priority logical channel that can be scheduled and that has data in the transmission buffer 10E of the UE 10. In this case X=PDU size of the highest priority having data in the buffer. Now either A, B or both must have data in order for the delay condition to be fulfilled, so that much is known. If A has data then X=200, if A does not have data then X=100.

5. Identify the E-TFC that has a transport block size X bits larger than the current E-TFC's transport block size, where X is the smallest RLC PDU size configured among the logical channels that can be scheduled and have data in the UE's transmission buffer. In this case if A and B both have data, or just B has data, then X=100, and if only A has data then X=200.

It can be seen that one exemplary advantage of defining the criteria as discussed above is that the UE 10 will only request a higher data rate if the UE actually can transmit with a higher data rate. The addition of the calculation of X, as compared to not considering the PDU size at all, should not, however, result in any significant degradation in UE 10 performance.

Based on the foregoing it should be apparent that the exemplary embodiments of this invention provide a method, apparatus and computer program product(s) to operate a UE 10 to set at least one rate request bit to request a higher data rate (or scheduling grant) than a current data rate (or scheduling grant) based at least in part on a consideration of: PDU size to identify an E-TFC that allows transmitting with the higher data rate.

Figure 6:
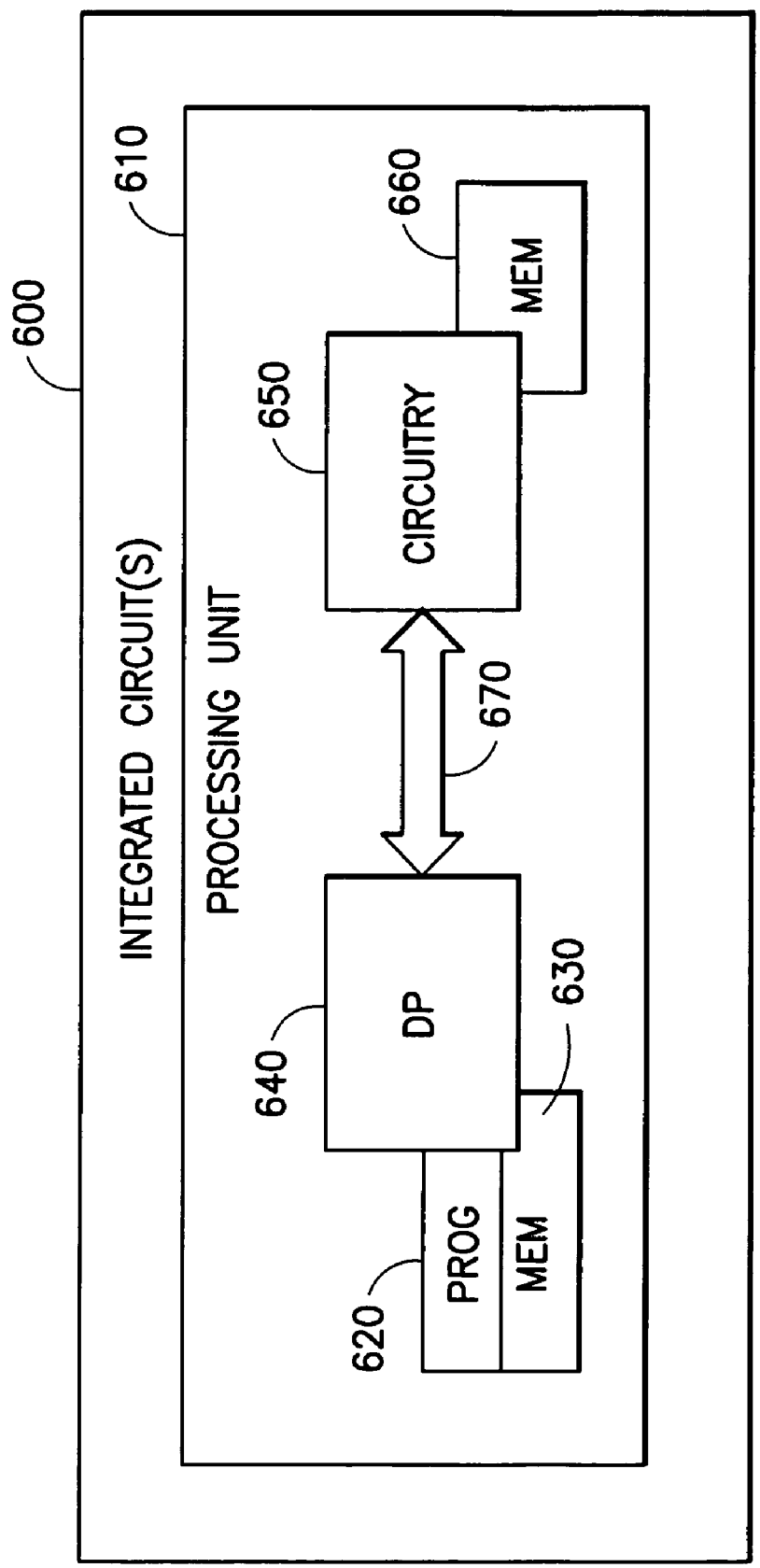
FIG. 6 is a block diagram of one or more exemplary integrated circuits suitable for use with embodiments of the disclosed invention.

In general, the various embodiments may be implemented in hardware such as special purpose circuits or software or any combination thereof. For example, some aspects may be implemented in hardware, while other aspects may be implemented in software (e.g., firmware) which may be executed by a data processor such as a controller, a microprocessor or other computing device, although the invention is not limited thereto. FIG. 6 shows one or more integrated circuits 600 that comprise a processing unit 610 configured to perform the exemplary embodiments described herein. The processing unit 610 comprises one or more data processors (DP) 640 (e.g., DP 10A of FIG. 1), a program 620 (e.g. PROG 10C of FIG. 1) with instructions suitable for execution on the DP 640, and a memory (MEM) 630 (e.g., MEM 10B of FIG. 1). The processing unit 610 may also include circuitry 650 designed to perform one or more of the techniques presented herein. The circuitry 650 may have access to memory (MEM) 660, e.g., for storage of information regarding E-TFCs 410, the selected E-TFC 441, and power offset 442. In this example, the circuitry 650 is coupled to the DP 640 through one or more buses 670. As other examples, the processing unit 610 comprises only the circuitry 650 (e.g., with or without MEM 660) or only the DP 640 and an associated MEM 630 having PROG 620.

While various aspects of the invention may be illustrated and described as block diagrams, flow charts, or using some other pictorial representation, it is well understood that these blocks, apparatus, systems, techniques or methods described herein may be implemented in, as non-limiting examples, hardware (e.g., special purpose circuits, logic, general purpose hardware, controllers, or other computing devices) or software (e.g., firmware) or some combination thereof.

Embodiments of the inventions may be practiced in various components such as integrated circuit modules (e.g., as shown in FIG. 6). The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Figure 7:
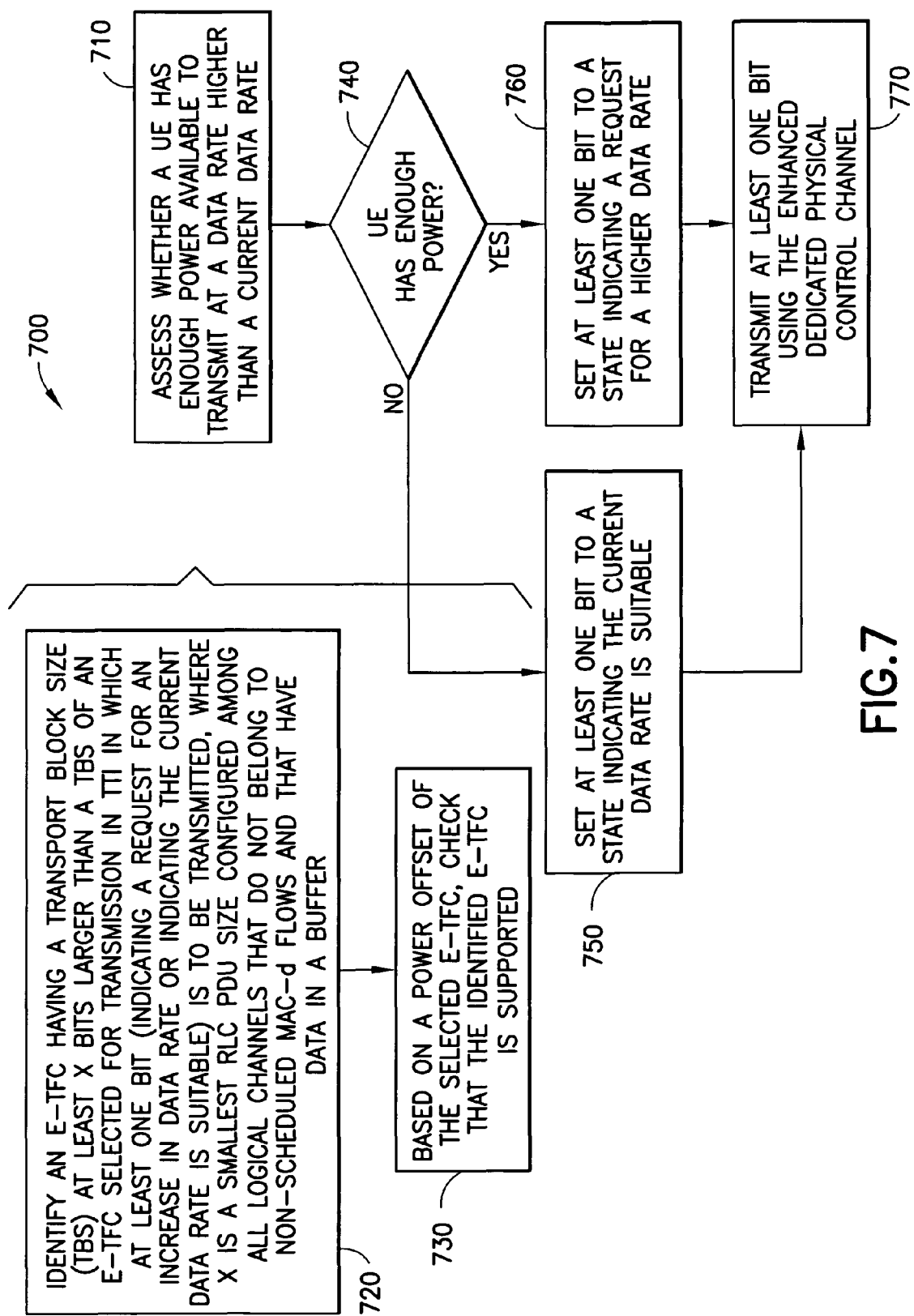
FIG. 7 is a logic flow diagram useful in explaining a more detailed version of the logic flow diagram of FIG. 3.

Referring now to FIG. 7, FIG. 7 shows a logic flow diagram useful in explaining a more detailed version of the logic flow diagram of FIG. 3. Method 700 shown in FIG. 7 starts in block 710, where it is assessed whether a UE has enough power available to transmit at a data rate higher than a current data rate (e.g., where the current data rate is used to transmit an E-TFC that has already been selected for transmission in a TTI in which a Happy Bit is to be transmitted). Block 710 may be performed using blocks 720 and 730.

In block 720, an E-TFC is identified having a transport block size at least x bits larger than a transport block size of an E-TFC that has already been selected for transmission in a TTI in which a Happy Bit (e.g., at least one bit indicating a request for an increase in data rate or indicating the current data rate is suitable) is to be transmitted. The x is chosen in this example as a smallest RLC PDU size configured among all logical channels that do not belong to non-scheduled MAC-d flows (i.e., that do below to scheduled MAC-d flows) and that have data in a buffer (e.g., buffer 10E in FIG. 1). In block 730, based on a power offset of the selected E-TFC, a check is made that the identified E-TFC is supported. Although more power is necessary using a given power offset to transmit the identified E-TFC than the selected E-TFC (which is smaller than the identified E-TFC), block 730 provides a reference a Node B (e.g., Base Station 12 of FIG. 1) can determine: by decoding data, the Node B should know which power offset was used. In other words, in this example, both the identified and the selected E-TFC should have the same power offset, although the actual transmission of the identified E-TFC will take more power than will transmission of the selected E-TFC.

Once the assessment is made in block 710, in block 740, it is determined whether the UE has enough power to transmit at a higher data rate than the current data rate. If not (block 740=NO), then the at least one bit (e.g., Happy Bit) is set to a state indicating the current data rate is suitable (i.e., the UE is "happy" with the current data rate). This occurs in block 750. If so (block 740=YES), the at least one bit (e.g., Happy Bit) is set to a state indicating a request for a higher data rate (i.e., the UE is "unhappy" with the current data rate). This occurs in block 760. In block 770, the at least one bit is transmitted in this example using the E-DPCCH.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention. For instance, although the description above is directed to a single Happy Bit, more than one bit may be modified (e.g., set or cleared) to request an increase in data rate or to indicate the current data rate is suitable. The more than one bit may be transmitted using any number of different messages.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
in response to selection of a first transport block to be transmitted through a wireless channel at a data rate, the selected, first transport block having a first transport block size, performing at least the following:
selecting, by a processor, a size for a data unit that can be scheduled for transmission;
identifying, by a processor, a potential transport block from a plurality of potential transport blocks, the identified potential transport block having a second transport block size that holds at least the selected size of the data unit and the first transport block size of the selected, first transport block;
determining, by a processor, whether the identified potential transport block is available for transmission; and
transmitting, via a transmitter, a request for an increase in the data rate in response to the identified potential transport block being available for transmission.

2. The method of claim 1, wherein determining whether the identified potential transport block is available for transmission further comprises determining whether the identified potential transport block is in a supported state.

3. The method of claim 2, wherein determining whether the identified potential transport block is available for transmission further comprises determining whether enough power is available to transmit the identified potential transport block during a time interval.

4. The method of claim 1, wherein transport block sizes of the potential transport blocks include a size of a header and a size of a data portion.

5. The method of claim 4, wherein:
each data unit is associated with a logical channel;
the method further includes determining if the data unit corresponding to the selected size belongs to a logical channel for which a first field indicating at least the logical channel is not available; and
identifying further comprises identifying the potential transport block having the second transport block size that holds at least the selected size of the data unit, the first transport block size of the selected, first transport block, a size of the first field and a size of a second field indicating a number of consecutive data units corresponding to the first field.

6. The method of claim 1, wherein transmitting further comprises modifying at least one bit to a state indicating the request for the increase in the data rate and transmitting the modified at least one bit.

7. The method of claim 6, wherein modifying further comprises setting a happy bit to a state of "unhappy" and transmitting the set happy bit.

8. The method of claim 1, wherein the wireless channel comprises an enhanced dedicated physical data channel, and wherein transmitting further comprises transmitting the request for the increase in the data rate through an enhanced dedicated physical control channel.

9. The method of claim 1, wherein the selected transport block comprises a transport block of an enhanced dedicated channel transport format combination, wherein the plurality of potential transport blocks comprise a plurality of potential transport blocks of enhanced dedicated channel transport format combinations that can be used to transmit data, and wherein the data unit comprises a protocol data unit from a radio link controller.

10. The method of claim 9, wherein:
the size for the data unit has X bits; and
identifying further comprises identifying one of the enhanced dedicated channel transport format combinations having a transport block size that is at least X bits larger than the transport block size of the selected enhanced dedicated channel transport format combination.

11. The method of claim 10, wherein:
selecting a size further comprises selecting an X that is determined to be a size of a smallest protocol data unit, from the radio link controller, configured among all logical channels that can be and are scheduled for transmission.

12. The method of claim 10, wherein:
selecting a size further comprises selecting an X that is determined to be a size of a largest protocol data unit, from the radio link controller, configured among all logical channels that can be and are scheduled for transmission.

13. The method of claim 10, wherein:
selecting a size further comprises selecting an X that is determined to be a size of a protocol data unit, from the radio link controller, configured for a highest priority logical channel that can be scheduled.

14. The method of claim 10, wherein:
selecting a size further comprises selecting an X that is determined to be a size of a protocol data unit, from the radio link controller, configured for a highest priority logical channel that can be scheduled and that has data in a transmission buffer.

15. The method of claim 10, wherein:
selecting a size further comprises selecting an X that is determined to be a size of a protocol data unit, from the radio link controller, configured among logical channels that can be scheduled and that have data in a transmission buffer.

16. The method of claim 1, further comprising determining whether an amount of data in a buffer criterion is met, and wherein selecting, identifying, determining whether the identified potential transport block is available for transmission, and transmitting are performed in response to a determination that the amount of data in the buffer criterion is met.

17. An apparatus, comprising at least one processor; and at least one memory including computer program code, the at least one memory and the computer program code configured to, with the at least one processor, cause the apparatus to perform at least the following:
responsive to selection of a first transport block to be transmitted through a wireless channel at a data rate, the selected, first transport block having a first transport block size,
to select a size for a data unit that can be scheduled for transmission,
to identify a potential transport block from a plurality of potential transport blocks, the identified potential transport block having a second transport block size that holds at least the selected size of the data unit and the first transport block size of the selected, first transport block,
to determine whether the identified potential transport block is available for transmission, and
to transmit a request for an increase in the data rate in response to the identified potential transport block being available for transmission.

18. The apparatus of claim 17, wherein the at least one processor is incorporated on at least one integrated circuit.

19. The apparatus of claim 17, further comprising a transceiver coupled to the at least one processor and at least one antenna coupled to the transceiver.

20. The apparatus of claim 17, comprising at least one of a cellular telephone, a personal digital assistant having wireless communication capabilities, a portable computer having wireless communication capabilities, an image capture device, a gaming device having wireless communication capabilities, a music storage and playback appliance having wireless communication capabilities, or an Internet appliance.

21. The apparatus of claim 17, wherein, when determining whether the identified potential transport block is available for transmission, the at least one memory and the computer program code are further configured to cause the apparatus to determine whether the identified potential transport block is in a supported state.

22. The apparatus of claim 21, wherein, when determining whether the identified potential transport block is available for transmission, the at least one memory and the computer program code are further configured to cause the apparatus to determine whether enough power is available to transmit the identified potential transport block during a time interval.

23. The apparatus of claim 17, wherein transport block sizes of the potential transport blocks include a size of a header and a size of a data portion.

24. The apparatus of claim 17, wherein, when transmitting, the at least one memory and the computer program code are further configured to cause the apparatus to modify at least one bit to a state indicating the request for the increase in the data rate and to transmit the modified at least one bit.

25. The apparatus of claim 24, wherein, when modifying, the at least one memory and the computer program code are further configured to cause the apparatus to set a happy bit to a state of "unhappy" and to transmit the set happy bit.

26. The apparatus of claim 17, wherein the wireless channel comprises an enhanced dedicated physical data channel, and wherein, when transmitting, the at least one memory and the computer program code are further configured to cause the apparatus to transmit the request for the increase in the data rate through an enhanced dedicated physical control channel.

27. The apparatus of claim 17, wherein the selected transport block comprises a transport block of an enhanced dedicated channel transport format combination, wherein the plurality of potential transport blocks comprise a plurality of potential transport blocks of enhanced dedicated channel transport format combinations that can be used to transmit data, and wherein the data unit comprises a protocol data unit from a radio link controller.

28. The apparatus of claim 17, wherein the at least one memory and the computer program code are further configured to cause the apparatus to determine whether an amount of data in a buffer criterion is met, and wherein the at least one memory and the computer program code are further configured to cause the apparatus to select, to identify, to determine whether the identified potential transport block is available for transmission, and to transmit in response to a determination that the amount of data in the buffer criterion is met.

29. A non-transitory computer readable memory tangibly embodying a program of machine-readable instructions executable by at least one data processor to perform operations comprising:
in response to selection of a first transport block to be transmitted through a wireless channel at a data rate, the selected, first transport block having a first transport block size, performing at least the following:
selecting a size for a data unit that can be scheduled for transmission;
identifying a potential transport block from a plurality of potential transport blocks, the identified potential transport block having a second transport block size that holds at least the selected size of the data unit and the first transport block size of the selected, first transport block;
determining whether the identified potential transport block is available for transmission; and
causing transmission of a request for an increase in the data rate in response to the identified potential transport block being available for transmission.

30. The computer readable memory of claim 29, wherein determining whether the identified potential transport block is available for transmission further comprises determining whether the identified potential transport block is in a supported state.

31. The computer readable memory of claim 30, wherein determining whether the identified potential transport block is available for transmission further comprises determining whether enough power is available to transmit the identified potential transport block during a time interval.

32. The computer readable memory of claim 29, wherein the transport block sizes of the potential transport blocks include a size of a header and a size of a data portion.

33. The computer readable memory of claim 29, wherein causing transmission further comprises modifying at least one bit to a state indicating the request for the increase in the data rate and causing transmission of the modified at least one bit.

34. The computer readable memory of claim 33, wherein modifying further comprises setting a happy bit to a state of "unhappy" and causing transmission of the set happy bit.

35. The computer readable memory of claim 29, wherein the wireless channel comprises an enhanced dedicated physical data channel, and wherein causing transmission further comprises causing transmission of the request for the increase in the data rate through an enhanced dedicated physical control channel.

36. The computer readable memory of claim 29, wherein the selected transport block comprises a transport block of an enhanced dedicated channel transport format combination, wherein the plurality of potential transport blocks comprise a plurality of potential transport blocks of enhanced dedicated channel transport format combinations that can be used to transmit data, and wherein the data unit comprises a protocol data unit from a radio link controller.

37. The computer readable memory of claim 29, wherein the operations further comprise determining whether an amount of data in a buffer criterion is met, and wherein selecting, identifying, determining whether the identified potential transport block is available for transmission, and causing transmission are performed in response to a determination that an amount of data in a buffer criterion is met.

38. An apparatus, comprising:
responsive to selection of a transport block to be transmitted through a wireless channel at a data rate, operating at least the following means:
means for selecting a size for a data unit that can be scheduled for transmission, the selected, first transport block having a first transport block size;
means for identifying a potential transport block from a plurality of potential transport blocks, the identified potential transport block having a second transport block size that holds at least the selected size of the data unit and the first transport block size of the selected, first transport block;
means for determining whether the identified potential transport block is available for transmission; and
means for transmitting a request for an increase in the data rate in response to the identified potential transport block being available for transmission.

39. The apparatus of claim 38, comprising at least one of a cellular telephone, a personal digital assistant having wireless communication capabilities, a portable computer having wireless communication capabilities, an image capture device, a gaming device having wireless communication capabilities, a music storage and playback appliance having wireless communication capabilities, or an Internet appliance.

40. A method comprising:
for an enhanced uplink dedicated channel transmission, setting, by a processor, at least one bit to a state indicating a request for a higher data rate if at least the following criterion is met: a user equipment has enough power available to transmit at a data rate higher than a data rate,
wherein assessment of whether the user equipment has enough power available comprises:
identifying, by a processor, an enhanced uplink dedicated channel transport format combination having a transport block size at least x bits larger than a transport block size of an enhanced uplink dedicated channel transport format combination selected for transmission in a transmission timing interval in which the at least one bit is to be transmitted, via a transmitter, where x is a smallest radio link control protocol data unit size configured among all logical channels that do not belong to non-scheduled medium access control-d flows and that have data in a buffer; and based on a power offset of the selected enhanced uplink dedicated channel transport format combination, checking, by a processor, that the identified enhanced uplink dedicated channel transport format combination is supported.

41. The method of claim 40, wherein setting at least one bit to the state requesting the higher data rate further comprises setting a happy bit to a state of "unhappy".

42. The method of claim 40, wherein checking further comprises determining that the identified enhanced uplink dedicated channel transport format combination is not blocked.

43. The method of claim 40, further comprising transmitting the at least one bit using an enhanced dedicated physical control channel.

44. An apparatus, comprising at least one processor; and at least one memory including computer program code, the at least one memory and the computer program code configured to, with the at least one processor, cause the apparatus to perform at least the following:

for an enhanced uplink dedicated channel transmission, to set at least one bit to a state indicating a request for a higher data rate if at least the following criterion is met: a user equipment has enough power available to transmit at a data rate higher than a data rate; and to assess whether the user equipment has enough power available by performing at least the following:

to identify a first enhanced uplink dedicated channel transport format combination having a first transport block size at least x bits larger than a second transport block size of a second enhanced uplink dedicated channel transport format combination selected for transmission in a transmission timing interval in which the at least one bit is to be transmitted, where x is a smallest radio link control protocol data unit size configured among all logical channels that do not belong to non-scheduled medium access control-d flows and that have data in a buffer; and based on a power offset of the selected, second enhanced uplink dedicated channel transport format combination, to check that the identified, first enhanced uplink dedicated channel transport format combination is supported.

45. The apparatus of claim 44, comprising at least one of a cellular telephone, a personal digital assistant having wireless communication capabilities, a portable computer having wireless communication capabilities, an image capture device, a gaming device having wireless communication capabilities, a music storage and playback appliance having wireless communication capabilities, or an Internet appliance.

46. The apparatus of claim 44, wherein the processor is further configured, when checking that the identified, first enhanced uplink dedicated channel transport format combination is supported, the at least one memory and the computer program code are further configured to cause the apparatus to determine that the identified, first enhanced uplink dedicated channel transport format combination is not blocked.

47. The apparatus of claim 44, wherein the at least one memory and the computer program code are further configured to cause the apparatus to cause the at least one bit to be transmitted using an enhanced dedicated physical control channel.

* * * * *